(12) United States Patent
Ellis et al.

(10) Patent No.: US 7,297,251 B2
(45) Date of Patent: Nov. 20, 2007

(54) MULTI-STAGE HYDRODESULFURIZATION OF CRACKED NAPHTHA STREAMS WITH A STACKED BED REACTOR

(75) Inventors: Edward S. Ellis, Falls Church, VA (US); Richard A. Demmin, Highland Park, NJ (US); John P. Greeley, Annandale, NJ (US); Gary B. McVicker, Califon, NJ (US); Bruce R. Cook, Stewartsville, NJ (US); Garland B. Brignac, Clinton, LA (US); Thomas R. Halbert, Baton Rouge, LA (US)

(73) Assignee: Exxonmobil Research and Engineering Company, Annandale, NJ (US)

(*) Notice: Subject to any disclaimer, the term of this patent is extended or adjusted under 35 U.S.C. 154(b) by 428 days.

(21) Appl. No.: 10/424,332

(22) Filed: Apr. 28, 2003

(65) Prior Publication Data
US 2004/0026298 A1   Feb. 12, 2004

Related U.S. Application Data

(60) Provisional application No. 60/382,271, filed on May 21, 2002.

(51) Int. Cl.
*C10G 45/04* (2006.01)
(52) U.S. Cl. ............ 208/210; 208/216 R; 208/216 PP; 208/217; 208/213
(58) Field of Classification Search ................ 208/210, 208/213, 216 R, 217, 216 PP
See application file for complete search history.

(56) References Cited

U.S. PATENT DOCUMENTS

| 4,340,466 | A | * | 7/1982 | Inooka ........................ 208/210 |
| 4,397,739 | A | | 8/1983 | Jacquin et al. .............. 208/210 |
| 4,902,404 | A | | 2/1990 | Ho ............................... 208/57 |
| 4,950,383 | A | * | 8/1990 | Tait et al. ..................... 208/59 |
| 5,985,136 | A | | 11/1999 | Brignac et al. .......... 208/216 R |
| 6,013,598 | A | | 1/2000 | Lapinski et al. ............ 502/305 |
| 6,126,814 | A | | 10/2000 | Lapinski et al. ............ 208/217 |
| 6,231,754 | B1 | | 5/2001 | Brignac et al. ............. 208/217 |

FOREIGN PATENT DOCUMENTS

GB    2073770    10/1981

OTHER PUBLICATIONS

S. J. Tauster, et al., "Structure and Properties of Molybdenum Sulfide: Correlation of $O_2$ Chemisorption with Hydrodesulfization Activity," Catalysis, 63, pp. 515-519 (1980).

* cited by examiner

*Primary Examiner*—Glen Caldarola
*Assistant Examiner*—John Douglas
(74) *Attorney, Agent, or Firm*—H. E. Naylor; L. E. Carter

(57) ABSTRACT

A process for the selective hydrodesulfurization of naphtha streams containing a substantial amount of olefins and organically bound sulfur. The naphtha stream is selectively hydrodesulfurized by passing it through a first reaction zone containing a bed of a first hydrodesulfurization catalyst, then passing the resulting product stream through a second reaction zone containing a bed of a second hydrodesulfurization catalyst, which second hydrodesulfurization catalyst contains a lower level of catalytic metals than the first hydrodesulfurization catalyst.

35 Claims, No Drawings

MULTI-STAGE HYDRODESULFURIZATION OF CRACKED NAPHTHA STREAMS WITH A STACKED BED REACTOR

CROSS REFERENCE TO RELATED APPLICATION

This application claims benefit of U.S. Provisional Application No. 60/382,271 filed May 21, 2002.

FIELD OF THE INVENTION

The present invention relates to a process for the selective hydrodesulfurization of naphtha streams containing a substantial amount of olefins and organically bound sulfur. The naphtha stream is selectively hydrodesulfurized by passing it through a first reaction zone containing a bed of a first hydrodesulfurization catalyst, then passing the resulting product stream through a second reaction zone containing a bed of a second hydrodesulfurization catalyst, which second hydrodesulfurization catalyst contains a lower level of catalytic metals than the first hydrodesulfurization catalyst.

BACKGROUND OF THE INVENTION

Environmentally driven regulatory pressure concerning motor gasoline sulfur levels are expected to result in the widespread production of less than 50 wppm sulfur mogas by the year 2004. Levels below 10 wppm are being considered for later years. In general, this will require deep desulfurization of cracked naphthas. Cracked naphthas are naphthas resulting from fluidized catalytic cracking operations, steam cracking, coking and related processes. Such naphthas typically contain substantial amounts of both sulfur and olefins. Deep desulfurization of cracked naphthas requires improved technology to reduce sulfur levels without the severe loss of octane that accompanies the undesirable saturation of olefins.

Hydrodesulfurization is one of the fundamental hydrotreating processes of refining and petrochemical industries. Hydrodesulfurization removes organically bound sulfur by conversion to hydrogen sulfide which is typically achieved by reaction with hydrogen over non-noble metal sulfided supported and unsupported catalysts, especially those of Co/Mo and Ni/Mo. This is usually achieved at fairly severe temperatures and pressures in order to meet product quality specifications, or to supply a desulfurized stream to a subsequent sulfur sensitive process.

Olefinic naphtha, such as cracked naphthas from fluid catalytic cracking and coker naphthas, can contain more than about 20 wt. % olefins. At least a portion of the olefins are hydrogenated during the hydrodesulfurization operation. Since olefins are high-octane components, for some motor fuel use, it is typically desirable to retain as much of the olefins as possible rather than to hydrogenate them to saturated compounds that are typically lower in octane. Conventional fresh hydrodesulfurization catalysts have both hydrogenation and desulfurization activity. Hydrodesulfurization of cracked naphthas using conventional naphtha desulfurization catalysts, under conventional conditions required for sulfur removal, typically leads to a significant loss of olefins through hydrogenation. This results in a lower grade fuel product that needs additional refining, such as isomerization, blending, etc., to produce the desired higher-octane fuels. Such additional refining, or course, adds significantly to the cost of the final naphtha product.

Selective hydrodesulfurization to remove organically bound sulfur while minimizing hydrogenation of olefins and octane reduction by various techniques, such as selective catalysts and/or process conditions, has been described in the art. For example, a process referred to as SCANfining has been developed by ExxonMobil Corporation in which olefinic naphthas are selectively desulfurized with little loss in octane. U.S. Pat. Nos. 5,985,136; 6,013,598; and 6,126,814, all of which are incorporated by reference herein, disclose various aspects of SCANfining. Although selective hydrodesulfurization processes have been developed to avoid significant olefin saturation and loss of octane, such processes have a tendency to liberate $H_2S$ that reacts with retained olefins to form mercaptan sulfur by reversion.

Many refiners are considering combinations of available sulfur removal technologies in order to optimize economic objectives. As refiners have sought to minimize capital investment to meet low sulfur mogas objectives, technology providers have devised various strategies that include distillation of the cracked naphtha into various fractions that are best suited to individual sulfur removal technologies. While economics of such systems may appear favorable compared to a single processing technology, the complexity of overall refinery operations is increased and successful mogas production is dependent upon numerous critical sulfur removal operations. Economically competitive sulfur removal strategies that minimize olefin saturation and capital investment and operational complexity are favored by refiners.

Consequently, there is a need in the art for technology that will reduce the cost of hydrotreating cracked naphthas, such as cat cracked naphthas and coker naphthas. There is also a need for more economical hydrotreating processes that minimize olefin saturation, total sulfur, and mercaptan sulfur resulting from mercaptan reversion.

SUMMARY OF THE INVENTION

In accordance with the present invention, there is provided a process for hydrodesulfurizing an olefinic naphtha boiling range feedstream and retaining a substantial amount of the olefins, which feedstream contains substantial amounts of organically bound sulfur and olefins, which process comprises:

a) hydrodesulfurizing said feedstream in a first reaction zone operated at hydrodesulfurization conditions and in the presence of hydrogen and a first hydrodesulfurization catalyst comprising 2 to 30 wt. % of a Group VIII metal oxide, 5 to 50 wt. % of a Group VI metal oxide, and a median pore diameter of about 60 Å to about 200 Å, said first reaction zone operated at hydrodesulfurizing conditions such that about 20% to about 99% of the desired total sulfur reduction of said feedstream occurs, thereby resulting in a partially desulfurized naphtha product stream; and b) hydrodesulfurizing the partially desulfurized naphtha product stream of step a) above in a second reaction zone operated at hydrodesulfurizing conditions and in the presence of hydrogen and a second hydrodesulfurization catalyst comprised of 0.1 to 27 wt. % of a Group VIII metal oxide, 1 to 45 wt. % of a Group VI metal oxide, and a median pore diameter of about 60 Å to about 200 Å, said second hydrodesulfurization catalyst having a metals loading such that each metal is present in an amount 10 to 95 wt. % less than the amount present on said first hydrodesulfurization catalyst and a median pore diameter equal to or greater than said first hydrodesulfurization catalyst.

In an embodiment, the amount of feed desulfurization in the first reaction zone ranges from about 20% to about 95% of the desired total sulfur reduction (to reach a targeted amount of sulfur removal in the process). Preferably, the amount of feed desulfurization zone ranges from about 20% to about 90% of the desired total sulfur reduction, more preferably from about 20% to about 75%, and still more preferably from about 20% to about 60%.

In a preferred embodiment the feedstream boils in the range of about 50° F. (10° C.) to about 450° F. (232° C.).

In another preferred embodiment the hydrodesulfurization reaction conditions include temperatures from about 232° C. (450° F.) to about 427° C. (800° F.), pressures of about 60 to 800 psig, and hydrogen treat gas rates of about 1000 to 6000 standard cubic feet per barrel.

In still another preferred embodiment, said first hydrodesulfurization catalyst has a median pore diameter of about 60 Å to about 200 Å, is comprised of a Mo catalytic component, a Co catalytic component and a support component, such that the Mo component is present in an amount of from about 1 to about 10 wt. %. calculated as $MoO_3$, and the Co component is present in an amount of from about 0.1 to about 5 wt. %, calculated as CoO, with a Co/Mo atomic ratio of about 0.1 to about 1.

DETAILED DESCRIPTION OF THE INVENTION

Feedstocks suitable for use in the present invention are olefinic naphtha boiling range refinery streams that typically boil in the range of about 50° (10° C.) to about 450° F. (232° C.). The term "olefinic naphtha stream" as used herein includes those streams having an olefin content of at least about 5 wt. %. Non-limiting examples of olefinic naphtha streams include fluid catalytic cracking unit naphtha (FCC catalytic naphtha or cat naphtha), steam cracked naphtha, and coker naphtha. Also included are blends of olefinic naphthas with non-olefinic naphthas as long as the blend has an olefin content of at least about 5 wt. %, based on the total weight of the naphtha stream.

Cracked naphtha refinery streams generally contain not only paraffins, naphthenes, and aromatics, but also unsaturates, such as open-chain and cyclic olefin, dienes, and cyclic hydrocarbons with olefinic side chains. The olefinic naphtha feedstream can contain an overall olefins concentration ranging as high as about 60 wt. %, more typically as high as about 50 wt. %, and most typically from about 5 wt. % to about 40 wt. %. The olefinic naphtha feedstream can also have a diene concentration up to about 15 wt. %, but more typically less than about 5 wt. % based on the total weight of the feedstock. The sulfur content of the olefinic naphtha will generally range from about 50 wppm to about 7000 wppm, more typically from about 100 wppm to about 5000 wppm, and most typically from about 200 to about 3000 wppm. The sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene and its higher homologs and analogs. Nitrogen can also be present in a range from about 5 wppm to about 500 wppm.

As previously mentioned, it is highly desirable to remove sulfur from cracked naphthas with as little olefin saturation as possible. It is also highly desirable to convert as much of the organic sulfur species of the naphtha to hydrogen sulfide with as little mercaptan reversion as possible. By mercaptan reversion we mean the reaction of hydrogen sulfide with olefins during the hydrodesulfurization process to form undesirable alkylmercaptans.

It has been found that unexpectedly high levels of sulfur can be removed from an olefinic naphtha stream without excessive olefins saturation or mercaptan reversion taking place. The feedstream to be desulfurized is typically preheated prior to entering the reactor for final heating to a targeted first desulfurization reaction zone temperature. The feedstream is sent to a first hydrodesulfurization zone where it is contacted with a first hydrodesulfurization catalyst, at hydrodesulfurization conditions, in the presence of a hydrogen-containing gaseous stream. If the naphtha feedstream is preheated, it can be reacted with the hydrogen-containing treat stream prior to, during, and/or after preheating. At least a portion of the hydrogen-containing treat gas can also be added at an intermediate location in the first hydrodesulfurization reaction zone. The hydrogen-containing treat gas stream can be comprised of substantially pure hydrogen or it can be in a mixture with other components typically found in refinery hydrogen streams. It is preferred that the hydrogen-containing treat gas stream contains little, more preferably no, hydrogen sulfide. The hydrogen-containing stream purity should be at least about 50% by volume hydrogen, preferably at least about 75% by volume hydrogen, and more preferably at least about 90% by volume hydrogen for best results. It is most preferred that the hydrogen-containing stream be substantially pure hydrogen.

The first hydrodesulfurization zone is preferably operated under selective hydrodesulfurization conditions that will vary as a function of the concentration and types of organically bound sulfur species of the feedstream. By "selective hydrodesulfurization" it is meant that the hydrodesulfurization zone is operated in a manner to achieve as high a level of sulfur removal as possible with as low a level of olefin saturation as possible. It is also operated to avoid as much mercaptan reversion as possible. Generally, hydrodesulfurization conditions, for both the first and second hydrodesulfurization zones, as well as any subsequent hydrodesulfurization zone include: temperatures from about 232° C. (450° F.) to about 427° C., (800° F.), preferably from about 260° C. (500° F.) to about 355° C. (671° F.); pressures from about 60 to 800 psig, preferably from about 200 to 500 psig; hydrogen feed rates of about 1000 to 6000 standard cubic feet per barrel (scf/b), preferably from about 1000 to 3000 scf/b; and liquid hourly space velocities of about 260° C. (500° F.) to about 355° C. (671° F.), more preferably from about 1 $hr^{-1}$ to about 5 $hr^{-1}$.

This first hydrodesulfurization reaction zone can be comprised of one or more fixed bed reactors each of which can comprise one or more catalyst beds of the same catalyst. Although other types of catalyst beds can be used, fixed beds are preferred. Such other types of catalyst beds include fluidized beds, ebullating beds, slurry beds, and moving beds. Interstage cooling between reactors, or between catalyst beds in the same reactor, can be employed since some olefin saturation can take place, and olefin saturation and the desulfurization reaction are generally exothermic. A portion of the heat generated during hydrodesulfurization can be recovered. Where this heat recovery option is not available, conventional cooling may be performed through cooling utilities such as cooling water or air, or through use of a hydrogen quench stream. In this manner, optimum reaction temperatures can be more easily maintained. It is preferred that the first hydrodesulfurization zone be configured in a manner and operated under hydrodesulfurization conditions such that from about 20% to 99%, more preferably from about 20% to about 95% of the total targeted amount of sulfur removal is reached in the first hydrodesulfurization zone, the further removal of sulfur to reach the total targeted amount of sulfur removal occurs in the second hydrodesulfurization zone. In other words, a total amount of feed sulfur removal is targeted for the process, with a greater portion of the total removed in the first hydrodesulfurization zone, and a lesser portion of the total removed in the second hydrodesulfurization zone. In an embodiment, the portion removed in the first hydrodesulfurization zone ranges upwards from about 20% of the total amount of feed sulfur removal target. The portion of the total feed sulfur removal target removed in the first hydrodesulfurization zone depends on the process's catalyst choice and operating conditions, as discussed. Typically, this portion will range from about 20% to about 60%, or about 75%, or about 90%, or about 99% of the total sulfur removal target.

Suitable hydrotreating catalysts for use in both the first and second hydrodesulfurization zones are those that are comprised of at least one Group VIII metal oxide, preferably an oxide of a metal selected from Fe, Co and Ni, more preferably Co and/or Ni, and most preferably Co; and at least one Group VI metal oxide, preferably an oxide of a metal selected from Mo and W, more preferably Mo, on a high surface area support material, preferably alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reaction vessel. The Group VIII metal oxide of the first hydrodesulfurization catalyst is typically present in an amount ranging from about 2 to about 20 wt. %, preferably from about 4 to about 12%. The Group VI metal oxide will typically be present in an amount ranging from about 5 to about 50 wt. %, preferably from about 10 to about 40 wt. %, and more preferably from about 20 to about 30 wt. %. All metal oxide weight percents are on support. By "on support" we mean that the percents are based on the weight of the support. For example, if the support were to weigh 100 g. then 20 wt. % Group VIII metal oxide would mean that 20 g. of Group VIII metal oxide was on the support.

Preferred properties of selective hydrodesulfurization catalysts used in the second hydrodesulfurization zone are characterized by having metal loadings within the above-described ranges. However, the second reaction zone hydrodesulfurization catalyst is characterized such that the wt. % of each metal oxide present on the second catalyst is about 10% to about 95% less than the amount of the same Group metal oxide present in the first zone hydrodesulfurization catalyst, preferably the wt. % of each metal oxide present in the second catalyst is about 30% to about 90% less than that of the first catalyst and most preferably about 50% to about 85% less. For example, if the first hydrodesulfurization catalyst contains 20 wt. % of a Group VIII metal oxide and 50 wt. % of a Group VI metal oxide, the second hydrodesulfurization catalyst will have a metals loading such that the Group VIII metal oxide is present in an amount about 10% to about 95% less than the 20wt. % of the Group VIII metal oxide present on the first hydrodesulfurization catalyst and the Group VI metal oxide is likewise present in an amount about 10% to about 95% less than the 50 wt. % of the Group VI metal oxide present on the first hydrodesulfurization catalyst. Further, the second hydrodesulfurization catalyst has a median pore diameter equal to or greater than the median pore diameter of the first hydrodesulfurization catalyst.

Preferred catalysts of the second hydrodesulfurization zone will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity," S. J. Tauster et al., *Journal of Catalysis* 63, pp 515-519 (1980), which is incorporated herein by reference. The Oxygen Chemisorption Test involves edge-plane area measurements made wherein pulses of oxygen are added to a carrier gas stream and thus rapidly traverse the catalyst bed. For example, the oxygen chemisorption will be from about 800 to 2,800, preferably from about 1,000 to 2,200, and more preferably from about 1,200 to 2,000 μmol oxygen/gram $MoO_3$. The terms "hydrotreating" and "hydrodesulfurization" are sometimes used interchangeably herein.

The most preferred catalysts for the second hydrodesulfurization zone can be characterized by the properties: (a) a $MoO_3$ concentration of about 1 to 25 wt. %, preferably about 4 to 19 wt. %, and more preferably about 5 to 16 wt. %, based on the total weight of the catalyst; (b) a CoO concentration of about 0.1 to 6 wt. %, preferably about 0.5 to 5.5 wt. %, and more preferably about 1 to 5 wt. %, also based on the total weight of the catalyst; (c) a Co/Mo atomic ratio of about 0.1 to about 1.0, preferably from about 0.20 to about 0.80, more preferably from about 0.25 to about 0.72; (d) a median pore diameter of about 60 Å to about 200 Å, preferably from about 75 Å to about 175 Å, and more preferably from about 80 Å to about 150 Å; (e) a $MoO_3$ surface concentration of about $0.5 \times 10^{-4}$ to about $3 \times 10^{-4}$ g. $MoO_3/m^2$, preferably about $0.75 \times 10^{-4}$ to about $2.5 \times 10^{-4}$, more preferably from about $1 \times 10^4$ to $2 \times 10^{-4}$; and (f) an average particle size diameter of less than 2.0 mm, preferably less than about 1.6 mm, more preferably less than about 1.4 mm, and most preferably as small as practical for a commercial hydrodesulfurization process unit.

The catalysts used in the practice of the present invention are preferably supported catalysts. Any suitable refractory catalyst support material, preferably inorganic oxide support materials may be used as supports for the catalyst of the present invention. Non-limiting examples of suitable support materials include: zeolites, alumina, silica, titania, calcium oxide, strontium oxide, barium oxide, carbons, zirconia, diatomaceous earth, lanthanide oxides including cerium oxide, lanthanum oxide, neodymium oxide, yttrium oxide, and praseodymium oxide; chromia, thorium oxide, urania, niobia, tantala, tin oxide, zinc oxide, and aluminum phosphate. Preferred are alumina, silica, and silica-alumina. More preferred is alumina. Magnesia can also be used for the catalysts with a high degree of metal sulfide edge plane area of the present invention. It is to be understood that the support material can also contain small amounts of contaminants, such as Fe, sulfates, silica, and various metal oxides that can be introduced during the preparation of the support material. These contaminants are present in the raw materials used to prepare the support and will preferably be present in amounts less than about 1 wt. %, based on the total weight of the support. It is more preferred that the support material be substantially free of such contaminants. It is an embodiment of the present invention that about 0 to 5 wt. %, preferably from about 0.5 to 4 wt. %, and more preferably from about 1 to 3 wt. %, of an additive be present in the support, which additive is selected from the group consisting of phosphorus and metals or metal oxides from Group IA (alkali metals) of the Periodic Table of the Elements.

The following examples are presented to illustrate the invention and should not be considered limiting in any way.

EXAMPLES

As used herein, Catalyst A is meant to refer to the catalyst present in the first hydrodesulfurization zone described above, and Catalyst B refers to the catalyst present in the second hydrodesulfurization zone described above.

In all of the following illustrative examples, unless otherwise indicated, the hydrodesulfurization relative catalyst activity (RCA) for Catalyst A was chosen to be 100%, the RCA for Catalyst B was chosen to be 400%, the outlet pressure is 300 psig, and the treat gas rate is 2000 standard cubic feet per barrel at 80% $H_2$ purity.

Example 1

The data in Table 1 is based on model predictions wherein Catalyst B is the hydrodesulfurization catalyst. The composition of Catalyst B is taken to be 4.3 wt. % $MoO_3$, 1.2 wt. % CoO, on alumina with a median pore diameter of 95 Å. The initial feedstream is a naphtha feedstream boiling in the range of about 50° F. (10° C.) to about 450° F. (232° C.) and contains 700 wppm sulfur and has a Bromine Number of 74 cg/g. This feedstream is desulfurized to 30 wppm sulfur under hydrodesulferization conditions. Conditions of the hydrodesulfurization reactor include 300 psig total pressure at the outlet of the reactor, a hydrogen treat gas rate of 2000 scf/bbl with the $H_2$ purity being 80:20 v/v $H_2:CH_3$, and a liquid hourly space velocity (LHSV) of 2.1 v/hr/v. The average temperature (T) of the reactor is calculated by measuring the inlet temperature ($T_{IN}$) of the reactor using a thermocouple device and also measuring the outlet temperature ($T_{OUT}$) of the reactor using a similar device. The average temperature is then calculated by dividing the sum of $T_{IN}$ and $T_{OUT}$ by 2. Also, the loss in octane number, both road octane number (RON) and motor octane number (MON), is determined. The total road octane loss is calculated by dividing by 2 the sum of the ΔRON and ΔMON.

TABLE 1

| | |
|---|---|
| Feed Sulfur wppm | 700 |
| Feed Bromine Number, cg/g | 74 |
| Average T = ($T_{IN}$ + $T_{OUT}$)/2, ° F. | 535 |
| Difference in $T_{IN}$ and $T_{OUT}$ Est. ° F. | 115 |
| LHSV, v/hr/v | 2.1 |
| Catalyst in Top Bed | B |
| Catalyst Volume (ft³) | 5552 |
| Catalyst in Bottom Bed | None |
| Total Catalst Volume (ft³) | 5552 |
| Product Sulfur, wppm | 30 |
| Δ RON loss | 5.46 |
| Δ MON loss | 2.04 |
| Δ Road Octane (loss) = (Δ RON (loss) + Δ MON (loss))/2 | 3.75 |

Example 2

The data in Table 2 was obtained by modeling the hydrodesulfurization of the naphtha feedstream of Example 1. The hydrodesulferization reactor conditions are disclosed in Table 2 along with the sulfur and bromine number of the feedstream. The data in Table 2 is obtained by using Catalyst A as the catalyst. Catalyst A was chosen to contain 15.0 wt. % $MoO_3$, 4.0 wt. % CoO, on alumina having a median pore diameter of 80 Å.

TABLE 2

| | |
|---|---|
| Feed Sulfur wppm | 700 |
| Feed Bromine Number, cg/g | 74 |
| Average T = ($T_{IN}$ + $T_{OUT}$)/2, ° F. | 535 |
| Difference in $T_{IN}$ and $T_{OUT}$ Est. ° F. | 120 |
| LHSV, v/hr/v | 7.9 |
| Catalyst in Top Bed | A |
| Catalyst Volume (ft³) | 1488 |
| Catalyst in Bottom Bed | None |
| Total Catalyst Volume (ft³) | 1488 |
| Product Sulfur, wppm | 30 |
| Δ RON loss | 5.74 |
| Δ MON (loss) | 2.18 |
| Δ Road Octane (loss) = (Δ RON (loss) + Δ MON (loss))/2 | 3.96 |

Example 3

The data in Table 3 was obtained by modeling the hydrodesulfurization of the naphtha feedstream of Example 1. The hydrodesulfurization reactor conditions chosen are disclosed in Table 3 along with the sulfur and bromine number of the feedstream. The data in Table 3 was obtained by utilizing two reaction stages in which Catalyst B was used in the first reaction stage, the top bed, as the first hydrodesulfurization catalyst, and Catalyst A in the second reaction stage, the bottom bed, as the second hydrodesulfurization catalyst.

TABLE 3

| | |
|---|---|
| Feed Sulfur wppm | 700 |
| Feed Bromine Number, cg/g | 74 |
| Average T = ($T_{IN}$ + $T_{OUT}$)/2, ° F. | 535 |
| Difference in $T_{IN}$ and $T_{OUT}$ Est. ° F. | 119 |
| LHSV, v/hr/v | 4.9 |
| Catalyst in Top Bed | B |
| Catalyst Volume (ft³) | 1202 |
| Catalyst in Bottom Bed | A |
| Catalyst Volume (ft³) | 1202 |
| Total Catalyst Volume (ft³) | 2403 |
| Product Sulfur, wppm | 30 |
| Δ RON (loss) | 5.73 |
| Δ MON (loss) | 2.17 |
| Δ Road Octane (loss) = (Δ RON (loss) + Δ MON (loss))/2 | 3.95 |

Example 4

The data in Table 4 was obtained by modeling the hydrodesulfurization of the naphtha feedstream of Example 1. The hydrodesulfurization reactor conditions are disclosed in Table 4 along with the sulfur and bromine number of the feedstream. The data in Table 4 was obtained by utilizing two reaction stages in which Catalyst A was used in the first reaction stage, top bed, as the first hydrodesulfurization catalyst, and Catalyst B in the second reaction stage, bottom bed, as the second hydrodesulfurization catalyst.

TABLE 4

| | |
|---|---|
| Feed Sulfur wppm | 700 |
| Feed Bromine Number, cg/g | 74 |
| Average T = ($T_{IN}$ + $T_{OUT}$)/2, ° F. | 535 |
| Difference in $T_{IN}$ and $T_{OUT}$ | 117 |

TABLE 4-continued

| | |
|---|---|
| Est. ° F. | |
| LHSV, v/hr/v | 5.2 |
| Catalyst in Top Bed | A |
| Catalyst Volume (ft³) | 1129 |
| Catalyst in Bottom Bed | B |
| Catalyst Volume (ft³) | 1129 |
| Total Catalyst Volume (ft³) | 2257 |
| Product Sulfur, wppm | 30 |
| Δ RON (loss) | 5.56 |
| Δ MON (loss) | 2.09 |
| Δ Road Octane (loss) = (Δ RON (loss) + Δ MON (loss))/2 | 3.83 |

The invention claimed is:

1. A process for hydrodesulfurizing an olefinic naphtha boiling range feedstream and retaining a substantial amount of the olefins, which feedstream contains a substantial amount of organically bound sulfur and olefins, which process comprises:
   a) hydrodesulfurizing said feedstrearn in a first reaction zone operated at hydrodesulfurization conditions and in the presence of hydrogen and a first hydrodesulfurization catalyst consisting essentially of about 1 to about 30 wt. % of CoO, about 5 to about 50 wt. % of $MoO_3$, and a median pore diameter of about 60 Å to about 200 Å, said first reaction zone operated at hydrodesulfurizing conditions such that from about 20% to about 99% of the sulfur reduction of said feedstreanx occurs in this first reaction zone, thereby resulting in a partially desulfurized product stream; and
   b) hydrodesulfurizing the partially desutfurized product stream of stop a) above in a second reaction zone operated at hydrodesulfurizing conditions containing a second hydrodesulfurization catalyst consisting essentially of about 0.1 to about 27 wt. % of CoO, about 1 to about 45 wt. % of $MoO_3$, and a median pore diameter of about 60 Å to about 200 Å, said second hydrodesulfurization catalyst having a metals loading such that each metal is present in an amount of about 10 to about 95% less than the amount present on said first hydrodesulfurization catalyst and a median pore diameter equal to or greater than said first hydrodesulfurization catalyst.

2. The process according to claim 1 in which said olefinie naphtha feedstream has an overall olefins content of up to about 60 wt. % and a sulfur content from about 50 wppm to about 7000 wppm.

3. The process according to claim 1 wherein said first and said second reaction zones are operated at a temperature from about 450° F. to about 800° F., a pressure of about 60 psig to about 800 psig, a hydrogen treat gas rate of about 1000 scf/b to about 6000 scf/b, and a liquid hourly space velocity of about 0.5 $hr^{-1}$ to about 15 $hr^{-1}$.

4. The process according to claim 3 wherein said first catalyst and said second catalyst arc supported on a suitable refractory support.

5. The process according to claim 4 in which said first catalyst in said first reaction zone contains about 2 to about 25.0 wt. % $MoO_3$, and about 1 to about 6.0 wt. % CoO.

6. The process according to claim 4 in which said second catalyst in said second reaction zone contains about 1.0 to about 10.0 wt. % $MoO_3$, and about 0.1 to about 5.0 wt. % CoO.

7. The process of claim 5 wherein said second hydrodosulfurization catalyst has a $MoO_3$ surface concentration of about $0.5 \times 10^{-4}$ to about $3.0 \times 10^{-4}$ g$MoO_3$/$m^2$, and an average particle diamcter of less than about 2.0 mm.

8. The process of claim 4 wherein said suitable refractory support is selected from zeolites, alumina, silica, titania, calcium oxide, strontium oxide, barium oxide, carbons, zirconia, diatomaceous earth, lanthanide oxides including cerium oxide, lanthanum oxide, neodymium oxide, yttrium oxide, and praseodymium oxide; chromia, thorium oxide, urania, niobia, tantala, tin oxide, zinc oxide, and aluminum phosphate.

9. The process of claim 8 wherein said suitable refractory support is selected from alumina, silica, and silica-alumina.

10. The process of claim 9 wherein said suitable refractory support is alumina.

11. The proccss according to claim 3 wherein from about 20% to about 60% of the sulfur reduction occurs in said first hydrodesulfurization zone.

12. The process according to claim 5 wherein said second catalyst has a Co/Mo ratio of about 0.1 to about 1.0.

13. The process of claim 1 wherein said olefinic naphtha feedstream is reacted in the vapor phase.

14. The process of claim 13 wherein interstage cooling is performed between the first and second hydrodesulfurization stages.

15. The process of claim 13 wherein the feedstream is preheated to a temperature up to the hydrodesulfurization temperature prior to entering the first reaction zone.

16. The process according to claim 2 in which said olefinie naphtha feedstream has a diene concentration of up to about 15 wt. %.

17. The process of claim 4 wherein said first hydrodesulfurization catalyst and said second hydrodesuifliriztion catalyst contains about 1.0 to about 3.0 wt. % of an additive selected from phosphorous, alkali metals, or alkali metal oxides.

18. A process for hydrodesulfurizing an olefinic naphtha feedstream and retaining a substantial amount of the olefins, which feedstream boils in the range of about 50° F. (10° C.) to about 450° F. (232° C.) and contains substantial amounts of organically bound sulfur, which process comprises:
   a) preheating said olefinic naphtha feedstreams;
   b) hydrodesulfurizing said feedstream in a first reaction zone operated at hydrodesulfurization conditions and in the presence of hydrogen and a first hydrodesulfurization catalyst comprised of about 1 to about 30 wt. % of a Group VIII metal oxide, about 5 to about 50 wt. % of a Group VI metal oxide, and a median pore diameter of about 60 Å to about 200 Å, said first reaction zone operated at hydrodesulfurizing conditions such that from about 20% to about 99% of the sulfur reduction of said feedstrearn occurs in this first reaction zone, thereby resulting in a partially desulltrized product stream; and
   c) hydrodesulfurizing the partially desuiflirized product stream of step b) above in a second reaction zone operated at hydrodesulfurizing conditions containing a second hydrodesulfurization catalyst having about 0.1 to about 27 wt. % of a Group VIII metal oxide, about 1 to about 45 wt. % of a Group VI metal oxide, and a median pore diameter of about 60 Å to about 200 Å, said second hydrodesulfurization catalyst having a metals loading such that each metal is present in an amount of about 10 to about 95% less than the amount of the same Group metal present on said first hydrodesulfurization ion catalyst and a median pore diameter equal to or greater than said first hydrodesulfurization catalyst.

19. The process according to claim 18 wherein said olefinic naphtha feedstream is contacted with a hydrogen containing gaseous stream prior to, during, or after preheating.

20. The process according to claim 18 wherein said hydrogen containing gaseous stream is added at an intermediate location in the first hydrodesulfurization reaction zone.

21. The process according to claim 18 wherein said hydrogen containing gaseous stream contains at least 50% by volume hydrogen.

22. The process of claim 18 wherein the feedstream has a overall olefins content of up to about 60 wt. % and a sulfur content from about 50 to 7000 wppm.

23. The process according to claim 22 wherein said first and said second reaction zones are operated at a temperature from about 450° F. to about 800° F., a pressure of about 60 psig to about 800 psig, a hydrogen treat gas rate of about 1000 scf/b to about 6000 scf/b, and a liquid hourly space velocity of about 0.5 hr$^{-1}$ to about 15 hr$^{-1}$.

24. The process according to claim 23 wherein said first catalyst and said second catalyst are supported on an alumina support.

25. The process according to claim 24 in which said first catalyst in said first reaction zone contains about 2 to about 25.0 wt. % $MoO_3$, and about 1 to about 6.0 wt. % CoO, and the second catalyst in said second reaction zone contains about 1.0 to about 10.0 wt. % $MoO_3$, and about 0.1 to about 5.0 wt. % CoO.

26. The process of claim 25 wherein said second hydrodesulfurization catalyst has a $MoO_3$ surface concentration of about $0.5 \times 10^{-4}$ to about $3.0 \times 10^{-4}$ $gMoO_3/m^2$, and an average particle diameter size diameter of less than about 2.0 mm.

27. The process according to claim 26 wherein from about 20% to about 60% of the sulfur reduction occurs in said first hydrodesulfurization zone.

28. The process according to claim 27 wherein said second catalyst has a Co/Mo ratio of about 0.1 to about 1.0.

29. The process of claim 18 wherein said Olefinic naphtha feedstream is reacted in the vapor phase.

30. The process of claim 18 wherein interstage cooling is performed between the first and second hydrodesulfurization stages.

31. The process of claim 18 wherein the feedstream is preheated to a temperature up to the hydrodesulfurization temperature prior to entering the first reaction zone.

32. The process according to claim 18 in which said olefinic naphtha feedstream has a diene concentration of up to about 15 wt. %.

33. The process of claim 18 wherein said first hydrodesulfurization catalyst and said second hydrodesulfurization catalyst contains about 1.0 to about 3.0 wt. % of an additive selected from phosphorous, alkali metals, or alkali metal oxides.

34. The process of claim 9 wherein said suitable refractory support is silica.

35. A process for hydrodesulfurizing an olefinic naphtha feedstream and retaining a substantial amount of the olefins, which feedstream boils in the range of about 50° F. (10° C.) to about 450° F. (232° C.) and contains substantial amounts of organically bound sulfur, which process comprises:

a) hydrodesulfurizing said feedstream in a first reaction zone operated at hydrodesulfurization conditions and in the presence of hydrogen and a first hydrodesulfurization catalyst comprised of about 1 to about 30 wt. % of a Group VIII metal oxide, about 5 to about 50 wt. % of a Group VI metal oxide, and a median pore diameter of about 60 Å to about 200 Å, said first hydrodesulfurization catalyst being supported on a refractory support selected from silica, alumina, and silica-alumina, said first reaction zone operated at hydrodesulfurizing conditions such that from about 20% to about 99% of the sulfur reduction of said feedstream occurs in this first reaction zone, thereby resulting in a partially desulfurized product stream; and b) hydrodesulfurizing the partially desulfurized product stream of step b) above in a second reaction zone operated at hydrodesulfurizing conditions containing a second hydrodesulfurization catalyst having about 0.1 to about 27 wt. % of a Group VIII metal oxide, about 1 about 45 wt. % of a Group VI metal oxide, and a median pore diameter of about 60 Å to about 200 Å, said second hydrodesulferization catalyst having a metals loading such that each metal is present in an amount of about 10 to about 95% less than the amount of the same Group metal present on said first hydrodesulfurization catalyst and a median pore diameter equal to or greater than said first hydrodesulfurization catalyst, said second hydrodesulfurization catalyst being supported on a refractory support selected from silica, alumina, and silica-alumina.

* * * * *